(12) United States Patent
Agarwal et al.

(10) Patent No.: US 11,095,645 B2
(45) Date of Patent: *Aug. 17, 2021

(54) VIRTUALIZATION OF THE EVOLVED PACKET CORE TO CREATE A LOCAL EPC

(71) Applicant: Parallel Wireless, Inc., Nashua, NH (US)

(72) Inventors: Kaitki Agarwal, Westford, MA (US); Steven Paul Papa, Windham, NH (US); Rajesh Kumar Mishra, Westford, MA (US)

(73) Assignee: Parallel Wireless, Inc., Nashua, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/800,295

(22) Filed: Feb. 25, 2020

(65) Prior Publication Data

US 2020/0196148 A1 Jun. 18, 2020

Related U.S. Application Data

(63) Continuation of application No. 15/334,270, filed on Oct. 25, 2016, now Pat. No. 10,575,173, which is a
(Continued)

(51) Int. Cl.
*H04L 29/00* (2006.01)
*H04L 29/06* (2006.01)
(Continued)

(52) U.S. Cl.
CPC .......... *H04L 63/0884* (2013.01); *H04W 8/04* (2013.01); *H04W 12/06* (2013.01);
(Continued)

(58) Field of Classification Search
CPC ....... H04W 12/06; H04W 76/15; H04W 8/04; H04W 8/10; H04W 24/02; H04W 84/18;
(Continued)

(56) References Cited

U.S. PATENT DOCUMENTS

| 2011/0002314 A1* | 1/2011 | Choi | H04W 28/0215 370/338 |
| 2011/0202970 A1* | 8/2011 | Kato | H04L 61/2015 726/1 |

(Continued)

*Primary Examiner* — Jeffrey C Pwu
*Assistant Examiner* — Helai Salehi
(74) *Attorney, Agent, or Firm* — Michael Y. Saji; David W. Rouille

(57) ABSTRACT

Systems and methods are disclosed for a local evolved packet core (EPC) that interoperates with an eNodeB and a remote EPC. In one embodiment, a method for establishing an ad hoc local network may be disclosed, comprising: monitoring an availability of a connection to a remote core network; creating a first data connection between a first mobile device and a local core network module, thereby permitting a first mobile device to attach to a local network base station without connectivity to the remote core network; identifying, at a local core network module, reconnection to the remote core network; sending, from the local core network module to the remote core network, a service request message based on a prior message received from the first mobile device at the local core network module; creating a second data connection between the local network base station and the remote core network; and forwarding downlink data, received from the remote core network via at the second data connection, to the first mobile device via the first data connection.

18 Claims, 6 Drawing Sheets

Related U.S. Application Data continuation of application No. 14/571,250, filed on Dec. 15, 2014, now Pat. No. 9,479,934.

(60) Provisional application No. 61/915,753, filed on Dec. 13, 2013.

(51) Int. Cl.

| | | |
|---|---|---|
| *H04W 8/04* | (2009.01) | |
| *H04W 76/15* | (2018.01) | |
| *H04W 12/06* | (2021.01) | |
| *H04W 12/062* | (2021.01) | |
| *H04W 84/18* | (2009.01) | |
| *H04W 24/02* | (2009.01) | |
| *H04M 15/00* | (2006.01) | |
| *H04W 8/10* | (2009.01) | |

(52) U.S. Cl.
CPC ......... *H04W 12/062* (2021.01); *H04W 76/15* (2018.02); *H04L 63/0892* (2013.01); *H04M 15/66* (2013.01); *H04W 8/10* (2013.01); *H04W 24/02* (2013.01); *H04W 84/18* (2013.01)

(58) Field of Classification Search
CPC ............. H04L 63/0884; H04L 63/0892; H04L 9/3226; H04L 9/3263; H04L 63/0807; H04L 63/0823; H04L 63/083
See application file for complete search history.

(56) References Cited

U.S. PATENT DOCUMENTS

| | | | | |
|---|---|---|---|---|
| 2012/0264470 | A1* | 10/2012 | Bajj | H04W 88/08 455/509 |
| 2013/0163463 | A1* | 6/2013 | Grayson | H04L 43/0876 370/253 |
| 2014/0134996 | A1* | 5/2014 | Barclay | H04W 24/00 455/422.1 |
| 2014/0233412 | A1* | 8/2014 | Mishra | H04W 84/02 370/252 |
| 2014/0269437 | A1* | 9/2014 | Kotecha | H04W 4/06 370/259 |
| 2015/0063166 | A1* | 3/2015 | Sif | G06F 9/45558 370/254 |
| 2015/0359020 | A1* | 12/2015 | Reynaud | H04W 24/04 370/329 |
| 2016/0037328 | A1* | 2/2016 | Raveendran | H04W 8/08 370/328 |

\* cited by examiner

VIRTUALIZATION OF THE EVOLVED PACKET CORE TO CREATE A LOCAL EPC

CROSS-REFERENCE TO RELATED APPLICATIONS

This application is a continuation under 35 U.S.C. § 120 of U.S. patent application Ser. No. 15/334,270, filed Oct. 25, 2016, and entitled "Virtualization of the Evolved Packet Core to Create a Local EPC," which itself is a continuation under 35 U.S.C. § 120 of U.S. patent application Ser. No. 14/571,250, filed Dec. 15, 2014, and entitled "Virtualization of the Evolved Packet Core to Create a Local EPC," which itself is a non-provisional conversion of, and claims the benefit of priority under 35 U.S.C. § 119(e) of, U.S. Provisional Patent Application No. 61/915,753, filed Dec. 13, 2013, and entitled "Virtualization of the Evolved Packet Core to Create Local EPC," which is hereby incorporated by reference in its entirety. In addition, this application incorporates the following applications by reference in their entirety: U.S. patent application Ser. No. 13/889,631, entitled "Heterogeneous Mesh Network and a Multi-RAT Node Used Therein," filed on May 8, 2013; U.S. patent application Ser. No. 14/034,915, entitled "Dynamic Multi-Access Wireless Network Virtualization," filed on Sep. 23, 2013; and U.S. patent application Ser. No. 14/211,355, entitled "Methods of Incorporating an Ad Hoc Cellular Network into a Fixed Cellular Network," filed Feb. 18, 2014.

BACKGROUND

As we make the transition from 3G to LTE, networks are becoming more advanced. Industry leaders such as Ericsson describe the transition from 2G/3G to LTE and the role that the Evolved Packet Core ("EPC") plays as follows: "[T]he difference with LTE is that it's all IP. In its simplest terms, moving to LTE means moving away from a packet/TDM network architecture to a simpler flatter all-IP packet-based infrastructure. This leads to blazingly fast speeds, impressive quality, and serious gains in efficiency—driving down the cost of sending a bit across the network."

However, without access to an EPC, LTE handsets and radio access networks lose their functionality. A need therefore exists for an EPC to be made available in circumstances where the normal EPC on the network is not directly accessible.

SUMMARY

Systems and methods are disclosed as further described herein. In one embodiment, a method for establishing an ad hoc local network may be disclosed, comprising: monitoring an availability of a connection to a remote core network; creating a first data connection between a first mobile device and a local core network module, thereby permitting a first mobile device to attach to a local network base station without connectivity to the remote core network; identifying, at a local core network module, reconnection to the remote core network; sending, from the local core network module to the remote core network, a service request message based on a prior message received from the first mobile device at the local core network module; creating a second data connection between the local network base station and the remote core network; and forwarding downlink data, received from the remote core network via at the second data connection, to the first mobile device via the first data connection.

The local core network module may further comprise a local mobility management entity (MME) module, and wherein the remote core network may further comprise a mobility management entity (MME), and further comprising sending, from the local MME module to the MME in the remote core network, a UE attach request as an eNodeB based on an initial attach request previously received at the local core network module. The received prior message may be a user equipment (UE) attach request and the service request message may be a second UE attach request. The first data connection may be a first default bearer between the UE and the local core network module, and the second data connection may be a second default bearer between the local core network module and the remote core network. The local core network module may be at the local network base station. The local core network module may be at a coordination node coupled as a gateway between the local network base station and the remote core network. The method may further comprise forwarding uplink data, received at the local network base station from the first mobile device via the first data connection, to the remote core network via the second data connection. The method may further comprise terminating an original user request for a core network service and reoriginating a request at the local core network module based on the original user request. The method may further comprise originating a user to user agent request based on an original user request. The method may further comprise acting as a back-to-back user agent for an original user request. The method may further comprise performing a user agent function for a plurality of user equipments. The method may further comprise monitoring, at a local network base station, the availability of the connection to the remote core network. The method may further comprise caching requests from the first mobile device until reconnection to the remote core network. The method may further comprise proxying communications between the first mobile device and the remote core network. The method may further comprise synchronizing application state for one or more mobile device applications. The method may further comprise establishing a mesh network with a second local network base station, and receiving core network requests from the second local network base station.

The remote core network may be a Long-Term Evolution (LTE) evolved packet core (EPC) and may include a mobility management entity (MME), a serving gateway (SGW), a packet gateway (PGW), and a home subscriber server (HSS). The method may further comprise virtualizing a plurality of core networks at the local network base station. The method may further comprise caching an authentication policy at the local core network module from a policy, charging, and rules function (PCRF) in the remote core network, and authenticating the first mobile device based on the cached authentication policy at the local core network module. The method may further comprise caching an authentication credential at the local core network module, the authentication credential comprising a billing, authorization, identification, or access credential associated with an identifier, wherein the identifier may further comprise an international mobile station equipment identifier (IMEI), international mobile subscriber identity (IMSI), integrated circuit card identifier (ICCID), globally unique temporary identifier (GUTI), inbound IP address, outbound IP address, medium access control (MAC) address, hardware configuration, hardware serial number, or encapsulation information created by the local network base station. The method may further comprise caching subscriber information from a remote home subscriber server (HSS) in the remote core network, the subscriber information comprising an integrity key, a cipher key, an international mobile station equipment identifier (IMEI), policies, or an authentication algorithm. The method may further comprise synchronizing cached billing information to the remote core network upon reconnection to the remote core network. The method may further comprise synchronizing cached data for performing charging functions or for performing policy enforcement upon reconnection to the remote core network. The method may further comprise providing 2G or 3G services via the local core network module and the remote core network.

In another embodiment, a wireless base station for establishing an ad hoc local network may be disclosed, comprising: a wireless interface for connecting to a mobile device; a backhaul connection for connecting to a remote core network; a processor coupled to the wireless interface and to the backhaul connection and configured to provide wireless access to the mobile device via the backhaul connection to the remote core network and to the mobile device without using the backhaul connection to the remote core network by providing local core network functionality at the wireless base station; and a memory coupled to the processor, the memory further comprising instructions which, when executed by the processor, cause the wireless base station to perform: monitoring an availability of a connection to the remote core network; creating a first data connection between the mobile device and a local core network module, thereby permitting the mobile device to attach to the wireless base station without connectivity to the remote core network; identifying, at a local core network module, reconnection to the remote core network; sending, from the local core network module to the remote core network, a service request message based on a prior message received from the first mobile device at the local core network module; creating a second data connection between the wireless base station and the remote core network; and forwarding downlink data, received from the remote core network via at the second data connection, to the mobile device via the first data connection.

In another embodiment, a wireless base station for establishing an ad hoc local network may be disclosed, comprising: a wireless interface for connecting to a mobile device; a backhaul connection for connecting to a remote core network; a processor coupled to the wireless interface and to the backhaul connection and configured to provide wireless access to the mobile device via the backhaul connection to the remote core network and to the mobile device without using the backhaul connection to the remote core network by providing local core network functionality at the wireless base station; and a memory coupled to the processor, the memory further comprising instructions which, when executed by the processor, cause the wireless base station to perform: monitoring an availability of a connection to the remote core network; receiving a first request from the mobile device to attach to the wireless base station at the wireless base station; creating a session for the mobile device at a local core network module via the coordination server; sending a first authorization message to the mobile device, thereby permitting the mobile device to attach to the wireless base station without use of the remote core network; receiving a second request from the mobile device coupled to the wireless base station to create a data session to transfer data from the mobile device to a second mobile device coupled to the wireless base station; sending a second authorization message to the mobile device to permit the mobile device to create the data session; and sending a message to the second mobile device to set up the data session from the mobile device to the second mobile device, thereby permitting the mobile device to create a bearer for communication with the second mobile device without use of the remote core network.

DETAILED DESCRIPTION

The LTE Architecture

Figure 1:
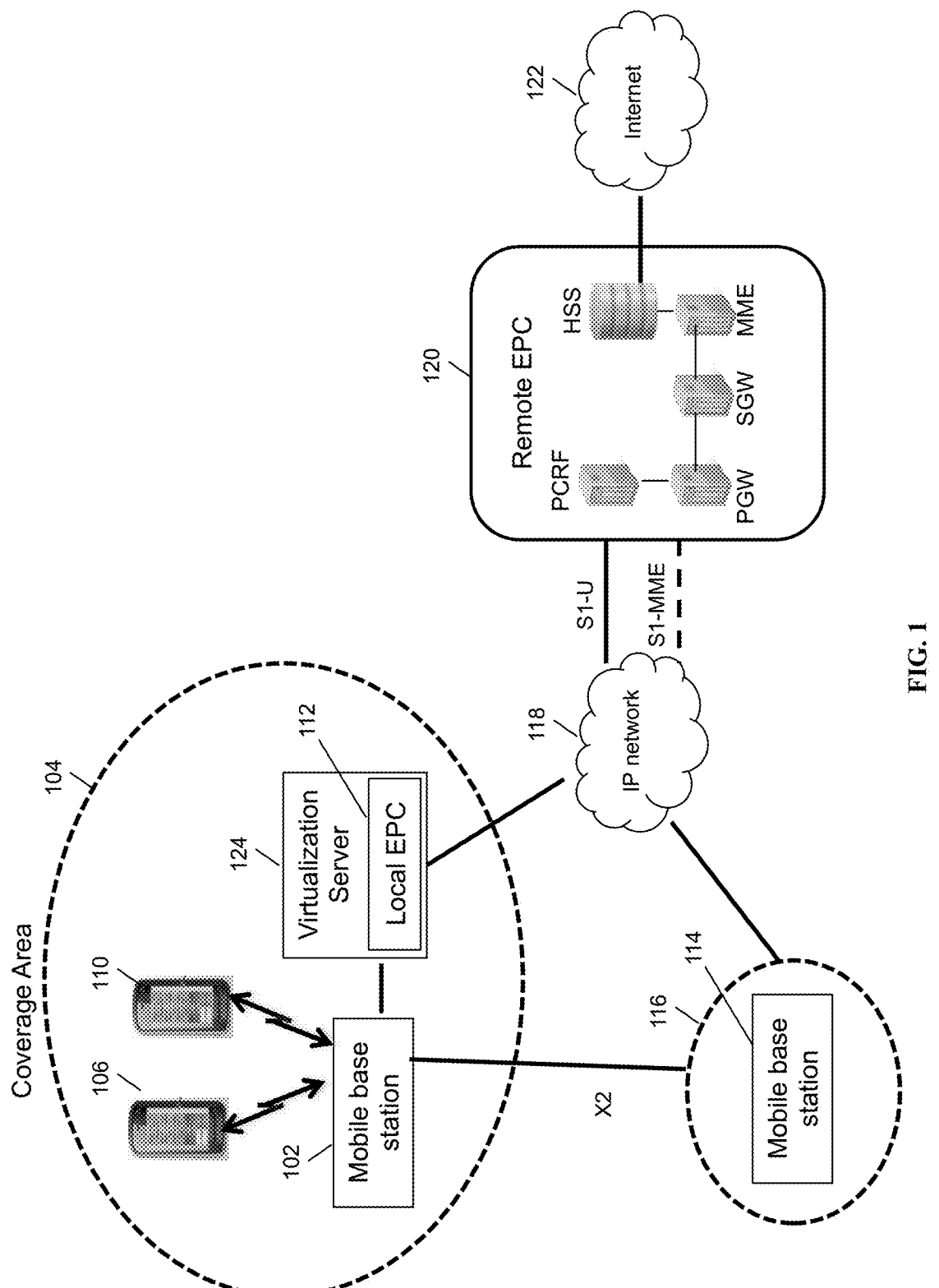
FIG. 1 is a schematic network diagram, in accordance with some embodiments.

The LTE architecture uses a centralized set of network nodes, collectively called the Evolved Packet Core (EPC). The EPC is both the brains and the brawn of the LTE network, providing much of the intelligence used to make LTE networks work.

When a mobile device connects to the network, data is sent over the air from the mobile device to the cellular tower where it is then transported, via the backhaul network, into a mobile operator's EPC. In the EPC, the received data is processed and forwarded from the mobile operator's network to the Internet or another public or private data network. The EPC includes one or more of the following nodes: a mobility management unit (MME), a serving gateway (SGW), a packet gateway (PGW), a home subscriber server (HSS), an authentication, authorization, and accounting server (AAA), a policy and charging rules function (PCRF), an evolved packet data gateway (ePDG), and/or other network nodes. The EPC processes the received data.

The PDN gateway (PGW) is involved in setting up bearers, which are IP-based tunnels using the GPRS Tunneling Protocol (GTP) to encapsulate and deliver data from a source to a destination. Before a user can talk through his voice service or watch a movie through his video service, separate bearer channels may be established, and policy parameters may be applied, at the PGW. Bearer channels in LTE are like individual private highways or delivery lanes dedicated to specific users and their data services. For example, a user may have a dedicated bearer channel for his voice service and at the same time may have another separate bearer channel for his video or Internet service. These bearer channels are helpful as they are assigned specific parameters that correspond to performance expectations that are defined by the user or operator.

The PGW is also the IP anchor point. It provides the exit and entry point of traffic from the mobile provider's network to the user equipment (UE), i.e. the user's mobile device. The PGW provides connectivity from the UE to the Internet, the IP Multimedia Subsystem (IMS) Core, if used, and other data networks. It represents the service edge of the mobile provider's network where processing of packets may be performed. Some of these functions include for each UE and each service:

creation and termination of the bearer channels
   packet inspection and filtering (determines which kind of service/application and thus which bearer channel should be used)
   policy enforcement (Quality of Service and charging support assigned to each bearer as defined by the user's individual package)
   accounting and reporting The Serving Gateway (SGW) contributes to mobility of the mobile device. The SGW routes and forwards user data packets through the bearer channels like the PGW. It also serves as the mobility anchor, where its job is to provide an anchor point for packet delivery even as the user changes location. The SGW also participates in setting up the bearer channel and manages and stores bearer channel information. Finally, the SGW is responsible for triggering paging (e.g. notifying and waking up radio resources) when downlink data arrives for the UE.

While the PGW and SGW are the "brawn," the MME may be thought of as the "brains." It operates in the control plane where it issues and receives instructions related to the network, services and applications. It has some key responsibilities:

assigns each UE to the proper SGW
   orchestrates the establishment of bearer channels in the network
   tracks the UE and dynamically assigns network resources as the user moves geographically
   authenticates the user by interacting with the HSS (the Home Subscriber Server, which is like a giant database of information for the LTE network)
   provides security management between the user device and the network Other EPC Nodes, such as the HSS, AAA, PCRF, and ePDG, are also part of the LTE architecture. The HSS is a central database that contains user-related and subscription-related information. The functions of the HSS include functionalities such as mobility management, call and session establishment support, user authentication and access authorization. The HSS is based on the pre-Rel-4 Home Location Register (HLR) and Authentication Center (AuC). The AAA is an authentication server, such as a remote authentication and dial-in user service (RADIUS) server, that authenticates users using access credentials and performs accounting functions, such as marking start and end times for a voice or data session. The PCRF provides policy control and flow-based charging control decisions, in conjunction with other policy control modules that are part of, e.g., the SGW and charging system. The ePDG serves to secure the data transmission with a UE connected to the EPC over an untrusted non-3GPP access. For this purpose, the ePDG acts as a termination node of IPsec tunnels established with the UE.

The Local EPC

While the above description describes the architecture of an evolved packet core (EPC) that connects to the Internet and other data services in an open fashion, an EPC can also be used in a local or closed network. In a local network, there may be a limited number of users who likely share the same eNodeB or share a small set of eNodeBs linked in a decentralized mesh network. Local networks can be formed with multiple eNodeBs, each of which may be within transmission range of another neighboring eNodeB in the network.

An EPC within the local network, otherwise identified herein as a local EPC, can connect users within a local network, and can facilitate the exchange of voice and data locally, even without connectivity to the Internet and all of the resources available in a typical open network. Such a local EPC can provide connectivity to a closed network when connectivity to a larger network is unavailable, e.g., users are in a no coverage or spotty coverage zone or there has been an event that has destroyed network infrastructure. Local EPCs also relieve the burden on network traffic in situations like emergency response, as such situations involve crews who may want to communicate with local users only, i.e., members of an emergency response team who need to use high-bandwidth video sharing applications with each other but who do not require significant connectivity with the public Internet.

In some embodiments, a local EPC may be located at a mobile base station. When the EPC itself is mobile, network links with other EPCs or with a remote EPC may decay or come online. A self-organizing network (SON) may be used, in some embodiments, to allow links to remain online when possible, or to create and delete routes within a mesh network. The varying network characteristics that are attendant with the mobility of the local EPC may be taken into account when assessing network characteristics, for example, when determining whether connectivity has been lost to a remote EPC.

In some embodiments, a local EPC may be hosted on a cloud coordination server. As the functionality of the local EPC is based on its being connected to the mobile base station when a remote EPC is unavailable, when the local EPC is hosted on a cloud coordination server, the cloud coordination server is be in communication with a mobile base station, for example, by being co-located with the mobile base station or by being connected to the mobile base station via wireless mesh link. The local EPC on the cloud coordination server may function in substantially the same way as a local EPC located on a mobile base station.

The local EPC may perform any and all functions typically performed by an EPC core network, in some embodiments. This includes, for example, authorization functions typically performed by an HSS or AAA; mobility management of mobile devices/UEs; handovers between mobile devices, as long as they are all connected to the local EPC; location information and location change reporting; charging functions; paging; GTP tunnel or bearer establishment; authorization for attach and detach messaging; user plane data forwarding and control plane data forwarding, including GTP tunnel creation and teardown for handovers; policy enforcement; and other functions. In addition, the local EPC may provide support for applications, in some embodiments. For example, the IP Multimedia Subsystem (IMS) is a system and architecture for delivering voice, video calling, and other real-time multimedia services over IP protocol networks. IMS is typically used within an operator core network to provide 3G and 4G calling services over IP, particularly in the core network. Services required for IMS may, for example, be provided in some embodiments. For example, a home subscriber server (HSS) may register the location of a mobile user's identity; a call session control function (CSCF) may provide session initiation protocol (SIP) proxying to allow the user to be reached; and media servers may also be integrated, for playing tones and mixing audio, in some embodiments. Each of these functions is generally understood within the prior art, and may be implemented within the local EPC, in some embodiments. In some embodiments, certain aspects of the functionality of the local EPC may be simplified to enable the local EPC to be lightweight.

In one embodiment a local EPC could be used in public safety applications. In this scenario, a public safety vehicle could have a base station or eNodeB and a local EPC housed within, with mobile devices connecting to the eNodeB and using the local EPC, thereby being enabled to use services within the local network. Communications between mobile devices that are using the local EPC may be permitted without requiring connectivity to the Internet. This may permit the use of mobile video, push-to-talk, and other applications to be used among personnel in the field, such as firefighters within a building, who may have an urgent need to communicate with each other for performing, e.g., search and rescue operations.

In this embodiment, at some point it may be advantageous for the local network to have a connection to the outside world. In order to facilitate this type of a connection, the local EPC may be virtualized. Network nodes, such as eNodeBs, that provide access to mobile devices may communicate with an EPC virtualization module instead of directly to an EPC, whether local or remote. The EPC may in turn communicate with the virtualization module, thereby providing two-way virtualization. The virtualization module may act as a proxy or as a back-to-back user agent (B2BUA) between the eNodeBs and the EPC. The virtualization module may support more than one eNodeB and/or more than one EPC, including one or more remote EPCs and one or more local EPCs, in some embodiments. From the perspective of the eNodeB, both the local and the remote EPCs are virtualized. Similarly, from the EPC's standpoint, the two-way virtualization could make many eNodeBs look like a single eNodeB. The EPC virtualization layers may be integrated into other virtualization layers, such as in a virtualizing cloud controller as described in U.S. patent application Ser. No. 14/034,915. Alternately, the EPC virtualization layer and local EPC described herein may be provided at a particular eNodeB in a mesh network of eNodeBs, or at every eNodeB in a radio access network.

In some embodiments, a local EPC may be created when needed. In some embodiments, the local EPC may be torn down, created/recreated, serialized/deserialized (e.g., state may be saved) locally or remotely, cloned from a preexisting image, or otherwise created or initiated. In some embodiments, the local EPC may be configured locally, using configuration files; configured/reconfigured remotely via a cloud configuration server; or configured with a static configuration that may not be changed.

In some embodiments, the local EPC could be part of a stationary small cell network. The devices, methods and networks described above may be equally applicable and may therefore create additional embodiments for small cells. In this embodiment, the backhaul costs may factor significantly into the computing cloud's decisions as to whether to utilize the local or the remote EPC. For example, if two users both within range of a single small cell were engaged in a voice call, the computing cloud may determine that sending the data packets from caller A to the network and then back to caller B and vice versa was too costly from an overhead perspective. In this scenario, the computing cloud could connect this call to a local EPC that is part of the small cell network.

Local EPC Operations

Monitoring

In some embodiments, wherein mobile devices are attached to a network and are presently relying on a local EPC but the coverage conditions change enough that they could reliably maintain a connection to a network EPC, the relevant coverage conditions may not necessarily be known to the mobile devices, and consequently, their eNodeBs may not facilitate a connection to the open network EPC. Rather, the local eNodeBs may continue to operate in local mode even though users would benefit from having access to the open network. It is provided, in some embodiments, to have a functional module that performs analysis on current coverage conditions and recommends toggling back and forth between using a local EPC and using a network EPC.

In some embodiments, the computing cloud device may monitor network conditions to determine when a local EPC should be created, or destroyed/torn down. Examples of network conditions that may be monitored include: connectivity, such as via a heartbeat message; latency; jitter; available total throughput; available route-specific throughput; the number of backhaul links present in a mesh network; relative connectivity or connection quality to other mesh network nodes; radio frequency (RF) signal characteristics such as a received signal strength indicator (RSSI), reference signal received power (RSRP), reference signal received quality (RSRQ), block error rate (BLER), or signal-to-noise ratio (SINR) of one or more RF channels/frequencies, or a number derived from these characteristics; congestion or load at the remote EPC; the change in any of these conditions over time; the relative value of any of these conditions compared to other connections or channels; or other factors.

In an additional embodiment where one or more eNodeBs have a connection to a remote EPC, one or more network conditions relating to this connection may be monitored, and the monitored conditions may be taken into account to predict whether the eNodeBs are likely to lose the connection to the remote EPC. Examples of network conditions that may be monitored include: connectivity, such as via a heartbeat message; latency; jitter; available total throughput; available route-specific throughput; the number of backhaul links present in a mesh network; relative connectivity or connection quality to other mesh network nodes; radio frequency (RF) signal characteristics such as a received signal strength indicator (RSSI), reference signal received power (RSRP), reference signal received quality (RSRQ), block error rate (BLER), or signal-to-noise ratio (SINR) of one or more RF channels/frequencies, or a number derived from these characteristics; congestion or load at the remote EPC; the change in any of these conditions over time; the relative value of any of these conditions compared to other connections or channels; or other factors. These determinations may be made at the node hosting the local EPC, in some embodiments, or at a remote cloud server, in some embodiments.

If, for example, the connection to the network EPC is degrading over time, a local EPC may be caused to be created, even before connectivity has been totally lost, in some embodiments. In additional embodiments, the computing cloud may monitor network conditions to determine if/when a connection back to a network EPC can be established or re-established, e.g., if/when network conditions improve beyond a threshold.

A heartbeat message may be used in some embodiments to verify connectivity. The local EPC, or the network node on which the local EPC is hosted, may periodically send a small amount of data to the remote EPC, with a configurable period. The local EPC may send a ping packet (i.e., an interne control message protocol, or ICMP, echo request message) to the remote EPC, and await a reply. Alternatively, the local EPC may monitor existing communications with the remote EPC to determine whether any data has been received from the remote EPC within a certain time interval.

In some embodiments, if it is determined that it is possible or likely that the eNodeBs may lose the connection to the remote EPC, preparations may be made at the local EPC to take over and replace the connection with the remote EPC. The preparations may include: introducing the local EPC as a transparent proxy between the eNodeBs and the remote EPC; identifying active sessions and transparently proxying those sessions; destroying or de-allocating unneeded sessions or bearers; downloading and caching authentication credentials, such as HSS or AAA data, which may specifically be one or more of an integrity key, a cipher key, an IMEI, authentication policies, or authentication algorithms from the HSS; to provide authentication to mobile devices once offline; synchronizing local and remote data for one or more applications; or other preparations. In other embodiments, the local EPC may be ready to take over at any time. The above preparations may be performed on an ongoing basis to facilitate this. In addition, all connections initiated by the eNodeBs or by the remote EPC may be proxied at the time the connection is made.

In some embodiments, the use of the local EPC and/or the remote EPC may be toggled, or switched, based on these conditions. In some embodiments, the remote EPC may be disconnected proactively; in other embodiments, the remote EPC may be disconnected when the local EPC determines that there is no connectivity; in other embodiments, the remote EPC may be disabled by default.

Proxying and Handovers

In some embodiments, a mesh network including multiple nodes may be provided, and one of the nodes may have a backhaul connection, while other nodes may be sharing the same backhaul connection. The node with the backhaul connection may be referred to as the backhaul node. This backhaul node may host a local EPC. UE handovers, including call, bearer, and session handovers, may be permitted between nodes in the mesh network, in which case each handover may involve communication with the local EPC at the backhaul node. For example, the local EPC may include MME functionality, so that a mobile device attached to any of the nodes in the mesh network may use the local EPC for mobility management, including during handover across mesh nodes. In the case that connectivity to the larger Internet is also available or is restored after an outage, the local EPC may synchronize its mobility state with an MME in the core network on the other side of the backhaul connection. In some embodiments, the local EPC may transparently proxy the MME connection and/or may only update the MME with mobility information starting at the time connectivity is achieved.

In some embodiments, handovers may be enabled from the local EPC to a remote EPC (such as an operator EPC), which may be referred to as "EPC handover." In an EPC handover, an active call, bearer, or session may be handed over to be serviced from a local EPC to a remote EPC, or from a remote EPC to a local EPC, at the same or different time as a UE handover. This may be performed using EPC sync, in some embodiments, and may involve the remote EPC being aware that a handover is occurring. Alternatively, the local EPC may serve as a transparent proxy or B2BUA to permit the EPC handover to occur transparently to both the UE and the remote EPC, such that the UE and the remote EPC both operate under the assumption that the remote EPC is hosting the call, bearer, or session. In some embodiments, a plurality of EPCs may be supported at the same time using, e.g., a lookup table or tagging to identify flows directed to a particular one of the plurality of EPCs. "EPC Handovers" between the plurality of EPCs may be supported.

In some embodiments, when performing a handover from the local EPC to a remote EPC of a currently-active, the local EPC may request creation of a new bearer to the remote EPC. After the remote EPC authenticates the mobile device and permits creation of the new bearer, and the new bearer is created, the local EPC may instruct the mobile device to redirect traffic from the local EPC to the remote EPC. Specifically, if a bearer is anchored at the serving gateway within the local EPC, the new bearer will be anchored at the remote EPC, so the mobile device is sent an instruction to forward data to the new remote EPC SGW from the local EPC SGW.

In other embodiments, handover may be performed transparently to the user by the local EPC making handover requests to the remote EPC on behalf of the mobile device, and acting as a back-to-back user agent (B2BUA). Although additional overhead may be incurred, this technique allows seamless handoffs, as the user's mobile device interacts only with the local EPC and is not required to set up a new bearer to the remote EPC. This technique is also suitable for network conditions wherein connectivity to the remote EPC is intermittently available.

In one embodiment, monitoring the availability of a connection to the remote EPC and then transitioning an in-progress data session from a local EPC to a remote EPC is disclosed. Firstly, if the computing cloud determines that a connection to the remote EPC is available, it may send the authentication information for these two users and their push-to-talk session to the remote EPC. The computing cloud could then initiate a bearer request to the remote EPC to open a data channel. The computing cloud could then talk to the application server on the remote EPC to reestablish the push-to-talk session between the two users on the remote EPC.

The computing cloud could then change the mapping and session ID in a manner transparent to the eNodeB and to the two users engaged in a push-to-talk session. In effect, the data path would be translated by the computing cloud. In this embodiment, the data path would be anchored at or within the computing cloud component. In this embodiment, the computing cloud operates at the control plane while commanding some component of the data plane to perform such mapping/bridging functions. In one embodiment, all calls may be proxied through a local Packet Data Network Gateway ("PGW") just in case detached operation is subsequently desired. In an alternate embodiment, the packet switching data plane in the local node can perform the desired NAT operation on demand and on live sessions without disconnecting the active session.

The computing cloud component does an IP address translation in order to make the transition of this in-progress session seamless. It could be said that the computing cloud plays a bridging or abstraction function. Moreover, the computing cloud keeps track of all of the IP address changes when the network switches from a local to a remote EPC so that the switch is transparent to the users, the eNodeB and the local or remote EPC.

In this embodiment, the concept of two-way virtualization is evident because the eNodeB may not be aware that that the computing cloud has transitioned its connection from a local EPC to a remote EPC. The computing cloud is thus managing the network from a higher level than that at which the EPC finds itself. Similarly, the EPC, whether it is the remote EPC or the local EPC believes that its connection with the computing cloud is actually a connection directly to the eNodeB.

Authentication

In some embodiments, in a situation in which a local EPC provides services to nodes within a mesh network, such as voice calling, a scheme known as "mutual authentication" may be used. In mutual authentication, while the local EPC may provide an authentication service, such as by emulating or providing an HSS server, since the local EPC may not have access to a core network and may therefore have no record of a newly-attached mobile device, the identity of the attaching mobile device may not be verifiable. To provide authentication in such a case, each node in the network may retain the ability to reject, approve, or otherwise authenticate a mobile device, independently. In some embodiments, authentication may involve interactive authentication, at a backhaul node, a local EPC, and/or at one or more node in a mesh network.

In some embodiments, IPSec tunnels, generic routing encapsulation (GRE) tunnels, or other tunnels or bearers may be established or re-established by a local EPC or controller node as needed. In some embodiments, encrypted communications may be decrypted to facilitate handling by the local EPC; in other embodiments, encrypted communications may be forwarded to the remote EPC. In some embodiments, to avoid having to tear down an encrypted bearer, the local EPC may act as a back-to-back user agent (B2BUA) proxy, decrypting communications from the mobile device and re-encrypting them when necessary before sending them to a remote EPC or other remote node.

In some embodiments, upon connection or reconnection to the backhaul network, the EPC-hosting node may perform a forced sync of one or more local EPCs on the node. This may include caching or downloading of authentication credentials for each local EPC, such as billing, authorization, identification, and/or access credentials associated with one or more identifiers, such as an international mobile station equipment identifier (IMEI), international mobile subscriber identity (IMSI), integrated circuit card identifier (ICCID), globally unique temporary identifier (GUTI), inbound or outbound IP address or medium access control (MAC) address, hardware configuration, hardware serial numbers, encapsulation by the transmitting base station, or other characteristics or identifiers. This may also include caching or downloading for one or more applications supported by each local EPC. This may also include caching or downloading information from the remote HSS, such as one or more of an integrity key, a cipher key, an IMEI, policies, and an authentication algorithm.

In some embodiments, the packet forwarding capability of a PGW is located at the local EPC. Such a local PGW may be enabled to use any and all network connections available at the local EPC node, including mesh backhaul connections, to transport data efficiently to their destinations. The local PGW may also be responsible for applying policy controls, such as quality of service (QoS) prioritizations.

Virtualization

In some embodiments, an eNodeB may interoperate with a virtualization layer that interoperates with either a local or a remote EPC. The virtualization layer, which may be located on a cloud coordination server, may detect reachability to a remote EPC, and may establish communications with the remote EPC and use it for routing traffic, in some embodiments. The virtualization layer may establish communications after reachability has been detected. The virtualization layer may also include middleware that switches between local and remote EPCs, and that syncs data between the local or remote EPCs to improve switching and to reduce interruption of sessions. Applications hosted locally may rely on the middleware layer to synchronize data between the local and remote EPC and switch to remote application servers, including but not limited to remote EPC servers. A heartbeat message may be used to detect remote EPC reachability from the virtualization server. The eNodeB may be mobile or may be fixed (stationary).

In some embodiments, the virtualization layer may be in a cloud coordination server, or may be executed on the same device as the eNodeB, or may be co-located with the eNodeB but in a separate device.

In some embodiments, more than one remote EPC may be used; in other embodiments, the local and remote EPCs may be used simultaneously. When multiple EPCs are provided or used, various characteristics of the attaching mobile devices may be considered to identify the appropriate EPC, such as international mobile station equipment identifier (IMEI), international mobile subscriber identity (IMSI), integrated circuit card identifier (ICCID), globally unique temporary identifier (GUTI), inbound or outbound IP address or medium access control (MAC) address, hardware configuration, hardware serial numbers, encapsulation by the transmitting base station, or other characteristics or identifiers. Various identifiers and data structures, such as key-value stores, databases, lookup tables, in-memory data structures, or other data structures may be used to map incoming packets to an appropriate local EPC or remote EPC.

In some embodiments, when multiple local EPCs are provided, certain aspects of the EPCs may be shared. For example, the HSS and AAA resources of several virtual local EPCs may in fact be the same software modules, configured to return a response that is indicative of the particular EPC to which a request was directed. In some embodiments, when necessary, network address translation (NAT) may be used to allow sharing of one or more network addresses or network interfaces, such as when sharing the SGW and PGW resources of a local EPC with multiple virtual local EPCs. In some embodiments, the sub-components of the local EPC, such as the HSS, the AAA, and the MME, may themselves be modularized and/or virtualized.

In some embodiments, the local EPC may provide reduced services, or may provide services with reduced performance. For example, a local EPC may be enabled to automatically authenticate all mobile devices that connect to it, in order to simplify management and synchronization. When the local EPC performs reduced services, toggling from use of the local EPC to the remote EPC may cause a disruption in service. For example, a mobile device may be attached to the local EPC but may not be authorized to use the remote EPC. In some embodiments, if mobile devices are not authorized to use the remote EPC, these devices may be handled only by the local EPC and may have their services restricted to local EPC services. As described elsewhere herein, when using the local EPC, mobile devices may have access to services provided within the local network.

Applications and Local EPCs

Applications may be supported in some embodiments. For example, in some embodiments, local services could include a dashboard of currently reachable emergency service workers, a broadcast/multicast server to distribute info to multiple workers, or other applications. These local services could be provided as webpages, apps, or other interfaces understood by those skilled in the art. Certain embodiments may relate to applications that use the IP Multimedia Subsystem (IMS). IMS is a commonly-used architecture for delivering voice and video multimedia services, including voice calls, over a telecommunications infrastructure, such as over an core network operated by a telecommunications operator. IMS describes the use of a Home Subscriber Server (HSS), for providing user identities; a Call Session Control Function (CSCF), for proxying session information protocol (SIP) packets for completing calls; application servers and media servers for providing application-specific and media protocol-specific functions; and charging servers for charging users for services. In some embodiments, IMS network nodes such as the HSS and CSCF may be considered to be part of an operator core network or EPC core.

In some embodiments, a software layer may be interposed between applications and one or more EPCs, including a local EPC. The software layer may provide synchronization services for applications that run on mobile devices connected to an EPC. Examples of applications may include, for example, push-to-talk (PTT) and public safety audio communications, voice over IP (VOIP), video calling, audio calling, text messaging, Web browsing or other HTTP-based file transport, calendar synchronization, email, file transfer or sync, or other applications. In some embodiments, one application may be used to perform command and control for all IMS-based communications, including voice, video, and/or billing.

In some embodiments, the software layer may operate using techniques common to back-to-back user agents (B2BUAs), caching clients/caching servers, men-in-the-middle, or other techniques that are transparent to the application client (e.g., the application running on a handset attached to the mobile base station), application server (e.g., a server located outside of the local base station or local area network), or both. In some embodiments, the software layer may provide explicit application programming interfaces (APIs) that permit an application client, an application server, or both to push data "up" from client to server, "down" from server to client, or both, which may be referred to as EPC sync. In some embodiments, the APIs may be RESTful (using the representational state transfer architectural style) and/or stateless. In some embodiments, the APIs may operate using inter-process communication between application processes running on the mobile base station itself. In some embodiments, specific data may be identified for synchronization, such as user login information or access credentials, while other data may be transmitted without synchronization, such as real-time protocol (RTP) audio or video packets.

In a typical scenario, a local EPC may synchronize mobility data from an MME, and authentication data from an HSS and/or AAA. However, if the remote EPC is accessed using a network connection that enables connectivity to the broader Internet, in many cases all connectivity to the Internet may be lost at the same time as connectivity to the remote EPC. In such a scenario, it follows that no calls or bearers to or from the Internet will survive a loss of connectivity, and thus no handovers or synchronization will be required.

Figures

FIG. 1 is a schematic network diagram, in accordance with some embodiments. Mobile base station 102, which is an eNodeB, provides access within coverage area 104 to mobile devices 106 and 110, which are UEs. The mobile base station 102 is in communication with a virtualization server 124, which may be a separate device or which may be on the same device as base station 102. The virtualization server 124 has a local evolved packet core (EPC) 112, which in some embodiments is co-located with a virtualization server, and in some embodiments is configured to operate on the same physical device as mobile base station 102.

Also shown is mobile base station 114 with coverage area 116. Mobile base station 114 does not have a local EPC. It is in communication with mobile base station 102 via the X2 bus. Mobile base stations 102 and 114 are in communication with EPC 120 via the S1-U and S1-MME protocols. Additionally, an IP network 116 is provided between the mobile base stations 102, 114 and remote EPC 120. Remote EPC 120 includes a policy, charging and rules function (PCRF), a packet gateway (PGW), a serving gateway (SGW), a mobility management entity (MME), and a home subscriber server (HSS). Remote EPC 120 also provides connectivity to the public Internet 122.

In one embodiment, shown in FIG. 1, two or more users could be connected to an eNodeB. Ordinarily, authentication is performed with the remote EPC at the time the UE attaches to the eNodeB. Once authentication is performed, the two UEs may exchange data at a present time, over a bearer allocated to facilitate this call and using, for example, a push-to-talk protocol.

Based on whether the connection to the remote EPC 120 is likely to be broken, and based on factors for determining this likelihood, mobile base station 102 may be configured to rapidly switch to local EPC 112 at an arbitrary time. In some embodiments, the local EPC 112 could continuously proxy application specific messages to facilitate a local push-to-talk call between the two users using the local EPC at all times. In some embodiments, this configuration and determination may be performed by virtualization server 124.

In some embodiments, virtualization server 124 may host additional virtualization layers, such as layers for virtualizing eNodeBs, virtualizing MMEs, virtualizing X2 protocol communications, or other virtualization layers. In some embodiments, virtualization server 124, local EPC 112, and base station 102 may be physically housed within a single device, or co-located at the same location in different chassis, or may be coupled together in a network fabric in various combinations.

Figure 2:
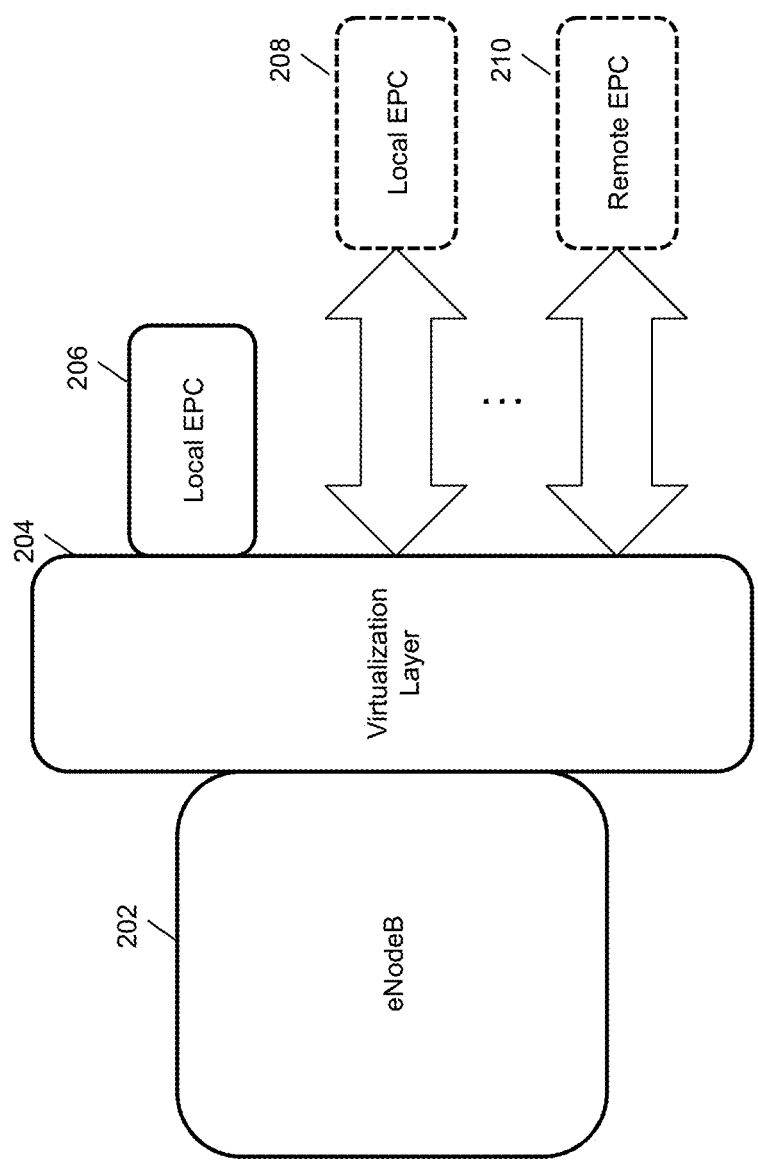
FIG. 2 is a schematic diagram showing a local EPC virtualization layer, in accordance with some embodiments.

FIG. 2 is a schematic diagram showing a local EPC virtualization layer, in accordance with some embodiments. The diagram shows multiple logical modules that may be present on a single device, such as virtualization server 124, in some embodiments, or spread over multiple devices, in other embodiments. Base station/eNodeB 202 is shown operating in close conjunction with, and on one side of, virtualization layer 204. Virtualization layer 204 is placed between eNodeB 202 and one or more EPCs 206, 208, 210. Local EPC 206 is coupled to virtualization layer 204, and although it may be present in the same physical device, access to it from eNodeB 202 is mediated and/or proxied through the virtualization layer. Additionally shown are local EPC 208, which resides on the local network but is not physically resident on the same device, and remote EPC 210, which resides on the operator core network and constitutes several servers.

The virtualization layer 204 may handle communications with a plurality of EPCs. eNodeB 202 benefits by being able to request services from the virtualization layer without having to explicitly identify a single EPC. By having the EPCs virtualized, the eNodeB may continue to be used by one or more attached UEs without regard to whether the operator EPC or remote EPC are connected. In some embodiments, two-way virtualization may be supported (i.e., supporting an arbitrary number of EPCs to an arbitrary number of eNodeBs, and vice versa).

The virtualization layer 204 is also configured to automatically select an appropriate EPC from the set of virtualized EPCs, in some embodiments. For example, virtualization layer 204 may permit mobile devices from different operator networks to interoperate even when no remote EPCs are available. This is made possible by creating a distinct local EPC for each operator EPC, in some embodiments, and transitioning any UE bearers to and from a particular operator's remote and local and local EPCs.

In some embodiments, more than one EPC may be supported. More than one remote EPC may be supported via virtualization of the remote EPC. More than one local EPC may be supported as well. In some embodiments, multiple mesh nodes may share a mini-EPC; in other embodiments, each mesh node has its own mini-EPC. In some embodiments, each mesh node may share a single virtualization server and virtualization layer 204; in other embodiments, each mesh node may have its own virtualization server.

Figure 3:
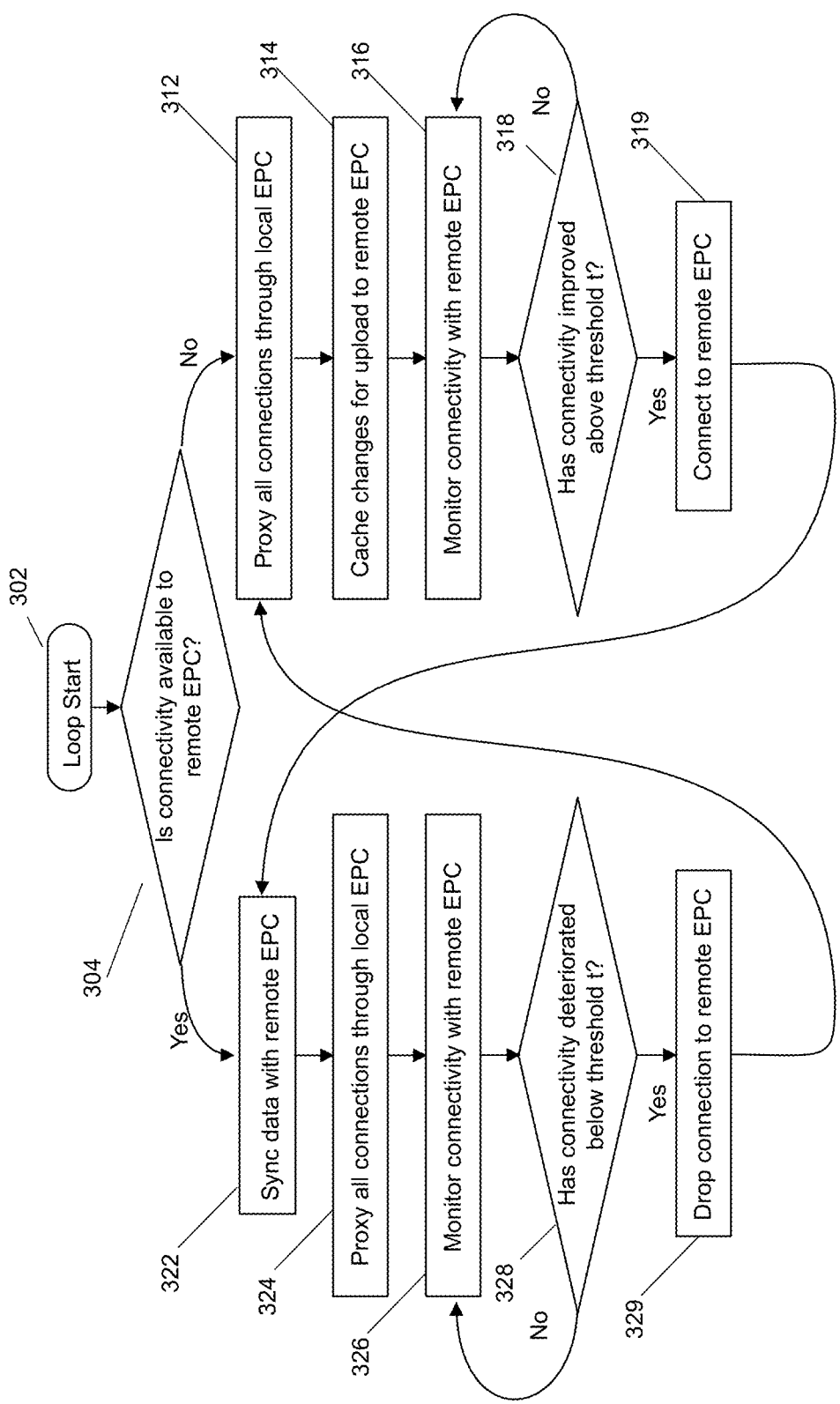
FIG. 3 is a flowchart showing switching between a local EPC and a remote EPC, in accordance with some embodiments.

FIG. 3 is a flowchart showing switching between a local EPC and a remote EPC, in accordance with some embodiments. The steps depicted may be performed at a virtualization server, in some embodiments, or in a virtualization layer of a base station equipped with a virtualization layer and local EPC, in some embodiments. Network connectivity is determined with respect to the network node performing the connectivity determination.

At step 302, operation starts. At step 304, current network conditions are analyzed to determine whether connectivity is available to the remote EPC. If connectivity is not available, operations are directed to the local EPC at step 312. If connectivity is currently available, operations are directed to the remote EPC at step 322.

At step 312, connectivity is not available to the remote EPC, resulting in the use of a local EPC. All accesses that would otherwise go to a remote EPC are instead sent to the local EPC. The local EPC then handles each request according to policies that are configured at the local EPC. For example, the local EPC may automatically authenticate any user equipment, automatically deny access, or grant access only to devices that match a set of cached credentials.

At step 314, certain operations may have been performed that caused state to be generated at the local EPC. For example, a UE attachment or a bearer creation may constitute new state values for the local EPC. These changes may be cached for later upload to the remote EPC.

At step 316, operation enters into a loop to monitor connectivity with the remote EPC. A heartbeat message may be sent at intervals to the remote EPC to determine whether it is accessible, or another method could be used. This loop exits when, at step 318, it is determined that connectivity to the remote EPC has improved above a threshold t, where the threshold is a numerical value used in comparison with one of the signal quality measures described herein, at which point the remote EPC is contacted at step 319. Control then passes from the local EPC to the remote EPC, at step 322.

At step 322, connectivity is available to the remote EPC. If possible, application data and authentication credentials, or other data, may be synced with the remote EPC. The data may have been generated at prior step 314 at a time when the local EPC was being used.

At step 324, although connectivity with the remote EPC is available, all connections continue to be proxied through the local EPC to enable the local EPC to pick up if the remote EPC loses connectivity. The local EPC is enabled to monitor all state changes as they are communicated to or from the remote EPC, and to mirror those changes in its own state.

At step 326, operation enters into a loop to monitor connectivity with the remote EPC. As described above, a heartbeat operation may be used. The loop exits if, at step 328, connectivity with the remote EPC is lost or falls below a threshold t, where the threshold is a numerical value used in comparison with one of the signal quality measures described herein. When connectivity is lost, the connection to the remote EPC is dropped at step 329 and control passes to the local EPC at step 312.

In an alternative embodiment (not shown), at step 304, additional factors in addition to connectivity may be used to determine whether to connect to a local EPC or a remote EPC. For example, characteristics of the network signal may be assessed, or a likelihood of imminent connectivity failure could be determined based thereon. Further, characteristics of various local EPCs may be evaluated to determine which EPC to connect to, such as the UE's IMEI and/or the operator of each local EPC.

Figure 4:
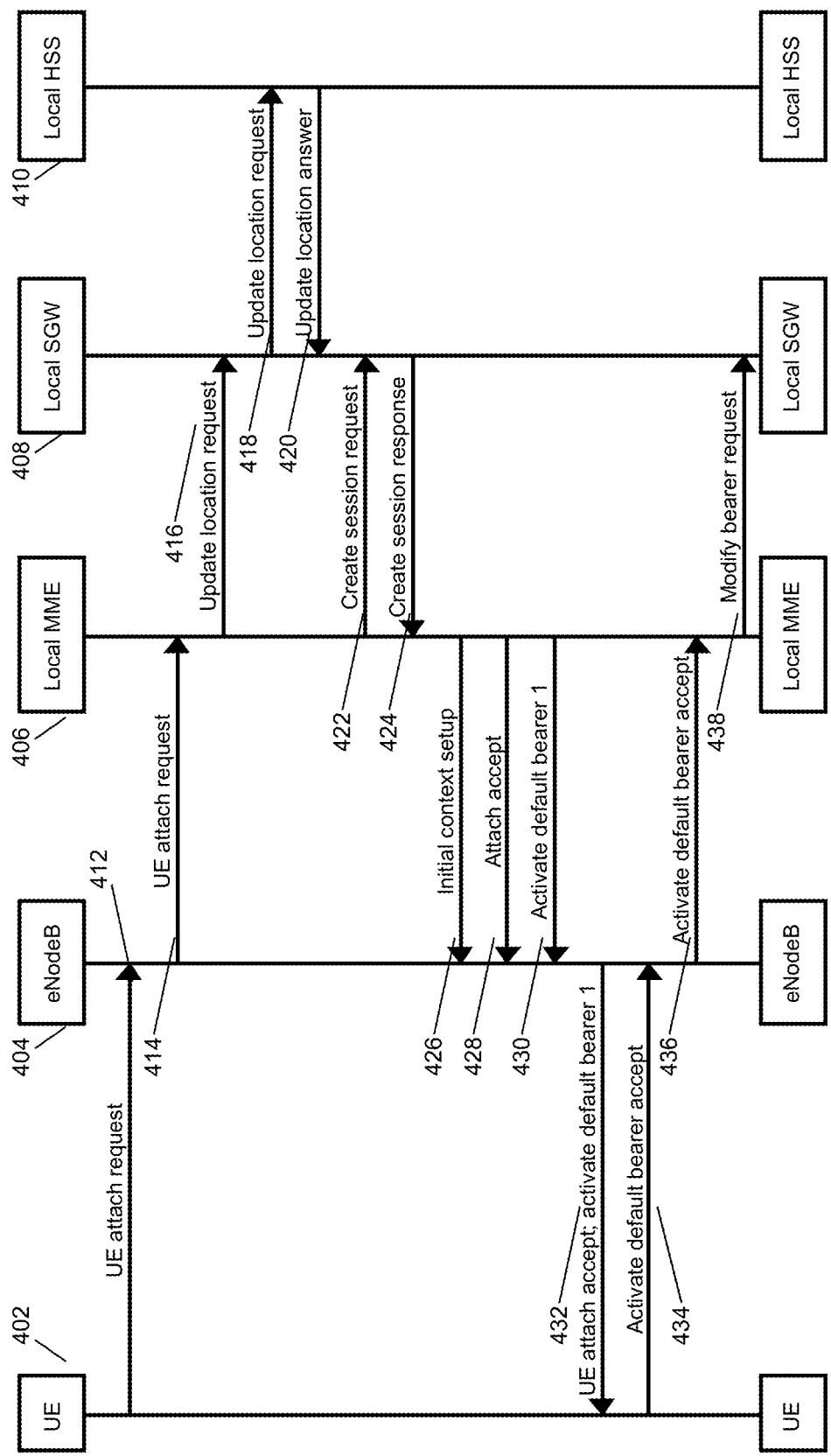
FIG. 4 is a signaling diagram of communications with a local EPC, in accordance with some embodiments.

FIG. 4 is a signaling diagram of communications with a local EPC, in accordance with some embodiments. UE 402, eNodeB 404, and local MME 406, local SGW 408, and local HSS 410 are depicted for purposes of signaling, and local MME 406, local SGW 408, and local HSS 410 are parts of a local EPC. While an attach procedure is shown in FIG. 4, one of skill in the art would understand that other procedures performed by mobile devices would be performed in an analogous way to that shown here in FIG. 4 and FIG. 5.

At step 412, UE 402 requests to attach to eNodeB 404. eNodeB 404 sends an attach request to its MME, which is local MME 406. MME 406 performs the same steps that a typical MME would take, but without relying on resources or data stored at the remote EPC. At step 416, local MME 406 sends an update location request to the local SGW 408, who forwards it to local HSS 410 at step 418.

Local HSS 410 notes the change and may or may not authenticate the UE to perform this step. Local HSS 410 returns a response at step 420, and stores the change for later upload to the remote EPC. While the location of the UE has been updated only within the scope of the local EPC and not within the rest of the operator's core network, it is assumed that this outcome is at least not harmful relative to the alternative, which would be a lack of any connectivity for UE 402 and no information about the UE's location being stored in any HSS anywhere.

At steps 422 and 424, the local MME and local SGW exchange a create session request and response. The local MME 406 then sends all of the initial context that has been set up to the eNodeB, at steps 426, 428, and 430. eNodeB 404 sends the attach acceptance to UE 402 at step 432. At step 434, the UE activates the default bearer, which is transmitted to eNodeB 404 and then to the local MME 406 and local SGW 408 (steps 436 and 438). The UE is now able to receive data from other devices on the local EPC.

Figure 5:
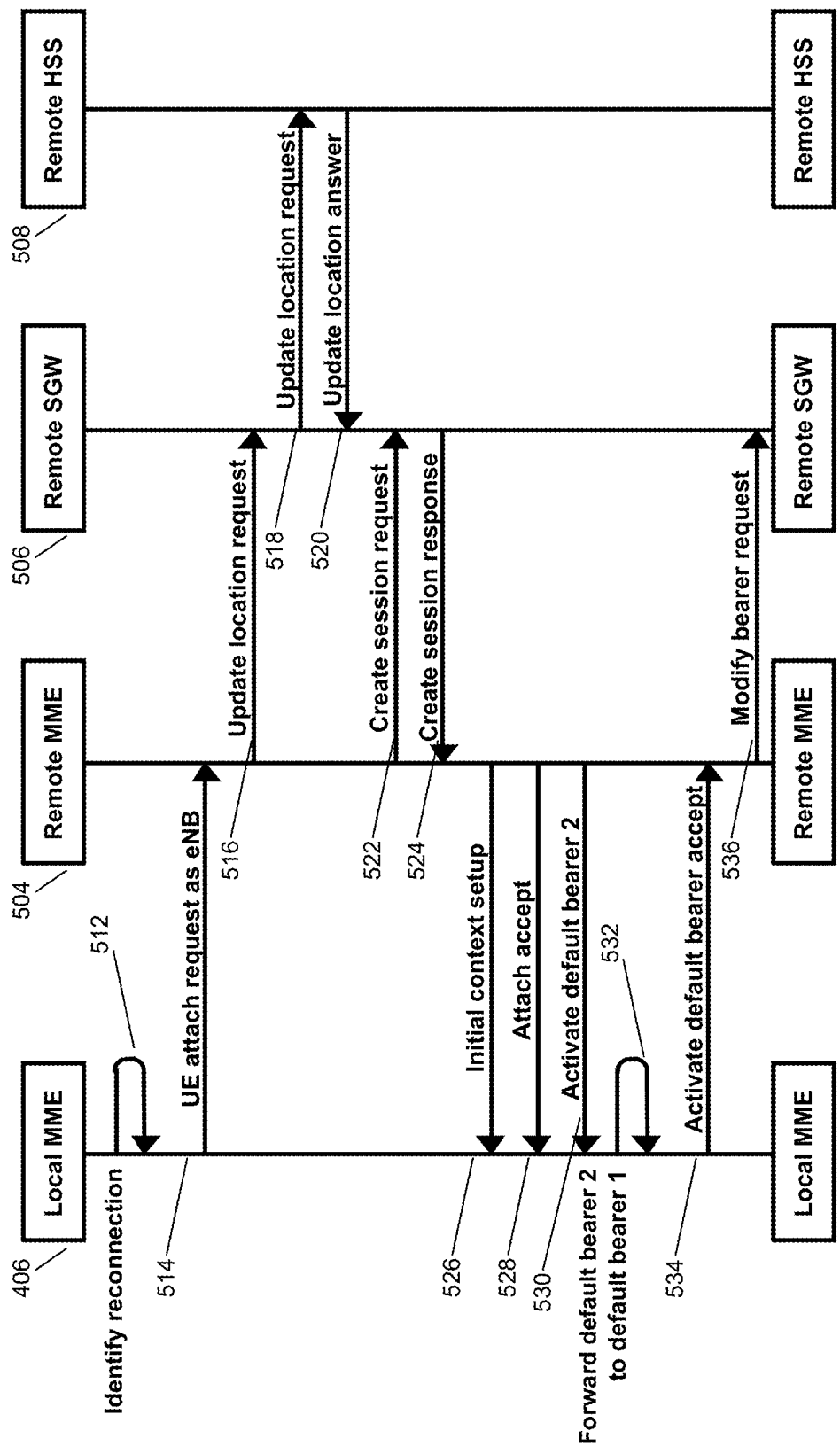
FIG. 5 is a signaling diagram of further communications between a local EPC and a remote EPC, in accordance with some embodiments.

FIG. 5 is a signaling diagram of further communications between a local EPC and a remote EPC, in accordance with some embodiments. At a prior time, a local EPC may have been used to perform various functions, such as the UE attach depicted in FIG. 4. FIG. 5 depicts a method for synchronizing the local EPC with the remote EPC, with respect to a single UE, in some embodiments. Although a remote EPC may have a proprietary synchronization mechanism for directly downloading data from a local EPC, and vice versa, the signaling sequence depicted in FIG. 5 does not require the remote EPC to perform any non-standard functions.

Recall that in FIG. 4, UE 402 attached to eNodeB 404, and communicated the attach to a local EPC. Local MME 406 is part of the local EPC. At step 512, MME 406 identifies reconnection of the remote EPC. At step 514, the local MME 406 sends a message as an eNodeB to request attach to remote MME 504. Remote MME 504 sends an update location request 516 to remote SGW 506, which sends an update location request 518 to remote HSS 508, which sends an update location answer 520 and updates the location of the UE at the remote HSS 508. A session is created at steps 522 and 524, a context is set up at step 526, the UE attach is accepted at step 528, and the default bearer is activated at 530. At step 534, the default bearer is accepted, and at step 536, the bearer modify request is sent from the MME to the SGW in the remote EPC.

The default bearer at step 530 is in fact a second default bearer, because a first default bearer was previously activated at step 434 in FIG. 4. However, the second default bearer is capable of sending and receiving data from any IP on the Internet or on the core network operator's network, unlike the first default bearer, which was limited to communicating on the local eNodeB only.

No indication that the bearer has been changed is sent to the UE directly. Instead, whenever data is received for the second default bearer, at step 532, local MME 406, which retains the first default bearer, sends the data from the remote EPC to the UE via the first default bearer.

Figure 6:
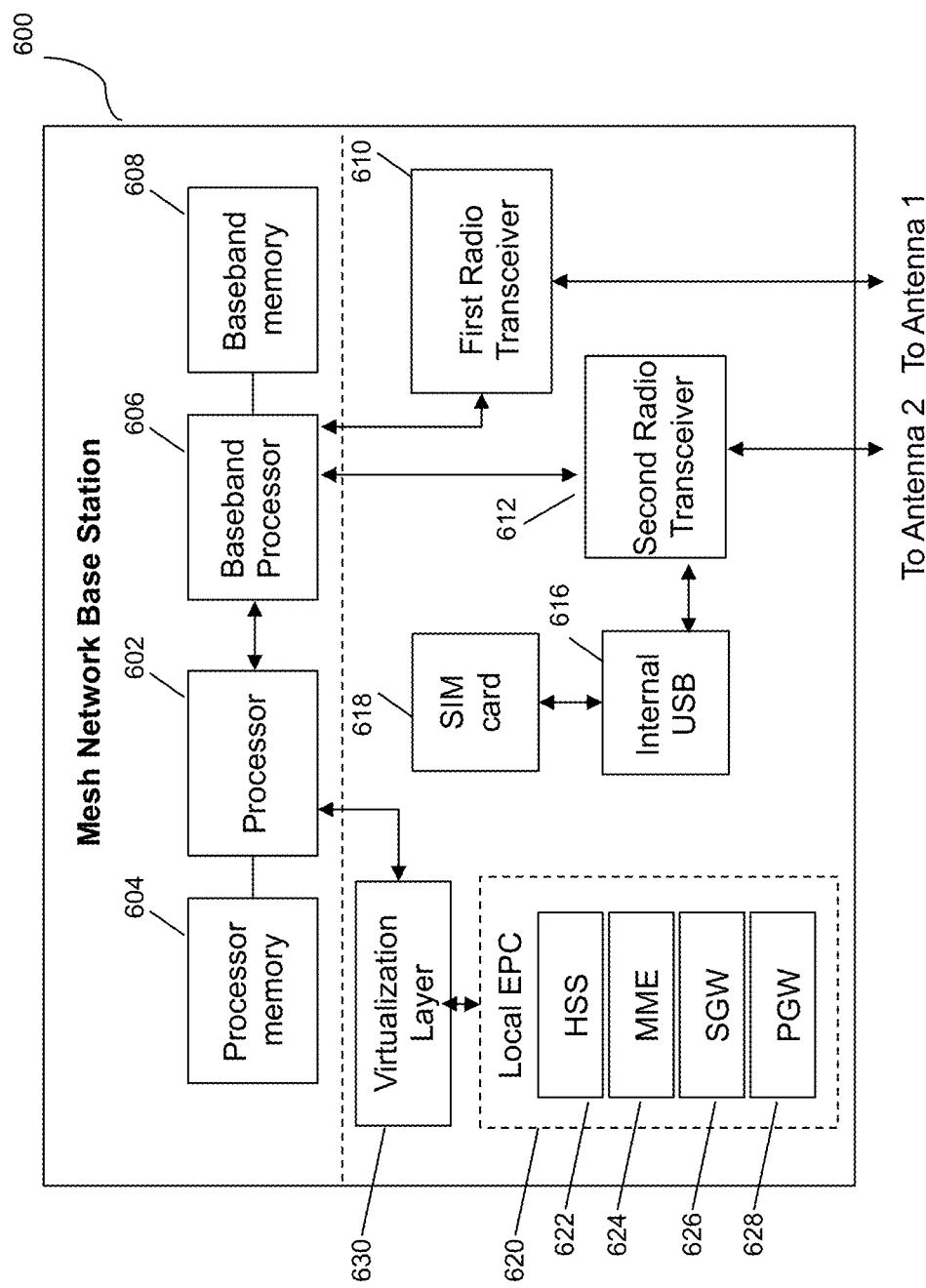
FIG. 6 is a schematic diagram of a mesh network base station, in accordance with some embodiments.

A physical device for use with the methods described herein is disclosed in connection with FIG. 6.

FIG. 6 is a schematic diagram of a mesh network base station, in accordance with some embodiments. Mesh network base station 600 may include processor 602, processor memory 604 in communication with the processor, baseband processor 606, and baseband processor memory 608 in communication with the baseband processor. Base station 600 may also include first radio transceiver 610 and second radio transceiver 612, internal universal serial bus (USB) port 616, and subscriber information module card (SIM card) 618 coupled to USB port 614. In some embodiments, the second radio transceiver 612 itself may be coupled to USB port 616, and communications from the baseband processor may be passed through USB port 616.

A virtualization layer 630 may also be included for mediating communications with an evolved packet core EPC, specifically including the core network EPC (not shown) and local evolved packet core (EPC) module 620. Local EPC 620 may be used for authenticating users and performing other EPC-dependent functions when no backhaul link is available. Local EPC 620 may include local HSS 622, local MME 624, local SGW 626, and local PGW 628, as well as other modules. Local EPC 620 may incorporate these modules as software modules, processes, or containers. Local EPC 620 may alternatively incorporate these modules as a small number of monolithic software processes. Virtualization layer 630 and local EPC 620 may each run on processor 602 or on another processor, or may be located within another device.

Processor 602 and baseband processor 606 are in communication with one another. Processor 602 may perform routing functions, and may determine if/when a switch in network configuration is needed. Baseband processor 606 may generate and receive radio signals for both radio transceivers 610 and 612, based on instructions from processor 602. In some embodiments, processors 602 and 606 may be on the same physical logic board. In other embodiments, they may be on separate logic boards.

The first radio transceiver 610 may be a radio transceiver capable of providing LTE eNodeB functionality, and may be capable of higher power and multi-channel OFDMA. The second radio transceiver 612 may be a radio transceiver capable of providing LTE UE functionality. Both transceivers 610 and 612 are capable of receiving and transmitting on one or more LTE bands. In some embodiments, either or both of transceivers 610 and 612 may be capable of providing both LTE eNodeB and LTE UE functionality. Transceiver 610 may be coupled to processor 602 via a Peripheral Component Interconnect-Express (PCI-E) bus, and/or via a daughtercard. As transceiver 612 is for providing LTE UE functionality, in effect emulating a user equipment, it may be connected via the same or different PCI-E bus, or by a USB bus, and may also be coupled to SIM card 618.

SIM card 618 may provide information required for authenticating the simulated UE to the evolved packet core (EPC). When no access to an operator EPC is available, local EPC 620 may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 600 is not an ordinary UE but instead is a special UE for providing backhaul to device 600.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 610 and 612, which may be Wi-Fi 802.11a/b/g/n/ac/ad/ah, Bluetooth, ZigBee, microwave (including line-of-sight microwave), or another wireless backhaul connection. Any of the wired and wireless connections may be used for either access or backhaul, according to identified network conditions and needs, and may be under the control of processor 602 for reconfiguration.

Other elements and/or modules may also be included, such as a home eNodeB, a local gateway (LGW), a self-organizing network (SON) module, or another module. Additional radio amplifiers, radio transceivers and/or wired network connections may also be included.

Processor 602 may identify the appropriate network configuration, and may perform routing of packets from one network interface to another accordingly. Processor 602 may use memory 604, in particular to store a routing table to be used for routing packets. Baseband processor 606 may perform operations to generate the radio frequency signals for transmission or retransmission by both transceivers 610 and 612. Baseband processor 606 may also perform operations to decode signals received by transceivers 610 and 612. Baseband processor 606 may use memory 608 to perform these tasks.

Alternatives

Various alternative embodiments are also contemplated by the inventors. For example, certain functions may be performed at an eNodeB, or at a multi-radio access technology node (multi-RAT) node, instead of at a cloud coordination server. The cloud coordination server may be known as an LTE access controller. The functions of the cloud coordination server may be broken up and spread across multiple network nodes, or multiple software or hardware modules within the same network node, and may be physically located in a single location, or multiple locations. The network node may be in the data path located between the radio access network (RAN) and the core network, in some embodiments, or may be located at another location in the network. A high-bandwidth wired connection may be used for backhaul, such as coaxial cable, fiber optic cable, or Ethernet, or a reduced-bandwidth wireless connection, such as microwave, line-of-sight, or other physical connections may be used as backhaul.

The protocols described herein may be optimized for greater or lesser latency, for more or fewer mesh nodes, for more or fewer data streams, and other alternatives. In some embodiments, these optimizations may be performed at the eNodeB, at the cloud coordination server, within a function performing radio resource allocation and coding selection, or at another location. In some embodiments, a cloud coordination server may identify and initiate power adjustments to improve channel quality.

In some embodiments, the mesh network nodes may provide complete or partial guesses at what paths are the optimal or best paths during a particular time interval, and may be enabled to send messages back to the cloud coordination server to communicate these complete or partial guesses.

In some embodiments, the base stations described herein may be compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, other 3G/2G, legacy TDD, or other air interfaces used for mobile telephony. In some embodiments, the base stations described herein may support Wi-Fi air interfaces, which may include one of 802.11a/b/g/n/ac/ad/af/ah. In some embodiments, the base stations described herein may support 802.16 (WiMAX), or other air interfaces. In some embodiments, the base stations described herein may provide access to land mobile radio (LMR)-associated radio frequency bands. In some embodiments, the base stations described herein may also support more than one of the above radio frequency protocols, and may also support transmit power adjustments for some or all of the radio frequency protocols supported.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to 2G, 3G, or UMTS-compatible networks, or to networks for additional protocols that utilize radio frequency data transmission. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Accordingly, the disclosure of the present invention is intended to be illustrative of, but not limiting of, the scope of the invention, which is specified in the following claims.

The invention claimed is:

1. A method for establishing an ad hoc local network, comprising:
   monitoring, at a coordination server, an availability of a connection to a remote core network;
   receiving a first request from a first mobile device to attach to a local network base station at the local network base station;
   creating a session for the first mobile device at a local core network module via the coordination server, wherein the local core network is configured to provide access to mobile edge computing (MEC) functionality;
   sending a first authorization message to the first mobile device, thereby permitting the first mobile device to attach to the local network base station without use of the remote core network;
   receiving a second request from the first mobile device coupled to the local network base station to create a data session to transfer data from the first mobile device to a second mobile device coupled to the local network base station;
   sending a second authorization message to the first mobile device to permit the first mobile device to create the data session; and
   sending a message to the second mobile device to set up the data session from the first mobile device to the second mobile device,
   thereby permitting the first mobile device to create a bearer for communication with the second mobile device without use of the remote core network.

2. The method of claim 1, further comprising sending location and the session for the first mobile device to the remote core network when the remote core network is connected to the local network base station.

3. The method of claim 1, further comprising proxying communications between the first mobile device and the remote core network.

4. The method of claim 1, further comprising synchronizing application state for one or more mobile device applications.

5. The method of claim 1, further comprising switching from a local core network mode to a remote core network mode based on the availability of the connection to the remote core network.

6. The method of claim 1, further comprising monitoring, at a coordination server, network characteristics including one or more of received signal strength indicator (RSSI), reference signal received power (RSRP), reference signal received quality (RSRQ), and block error rate (BLER), and switching to a local core network module mode when the monitored network characteristics are determined to be below a threshold.

7. The method of claim 1, further comprising creating a local core network module based on the availability of the connection to the remote core network.

8. The method of claim 1, further comprising sending, at periodic intervals, a heartbeat message to the remote core network in order to determine whether connectivity is available.

9. The method of claim 1, further comprising performing a handover of a bearer from the local core network module to the remote core network.

10. The method of claim 1, further comprising performing a handover of a bearer from the remote core network to the local core network module.

11. The method of claim 1, further comprising caching authentication credentials from the remote core network for use in authorizing mobile device requests.

12. The method of claim 1, further comprising authenticating the first mobile device at each local base station providing services to the mobile device, thereby requiring mutual authentication by base stations in a network.

13. The method of claim 1, further comprising establishing a mesh network with a second local network base station, and receiving core network requests from the second local network base station.

14. The method of claim 1, wherein the remote core network is a Long-Term Evolution (LTE) evolved packet core (EPC) and includes a mobility management entity (MME), a serving gateway (SGW), a packet gateway (PGW), and a home subscriber server (HSS).

15. The method of claim 1, further comprising virtualizing a plurality of core networks at the local network base station.

16. The method of claim 4, wherein the one or more mobile device applications includes one of: push-to-talk (PTT), public safety audio communications, voice over IP (VOIP), video calling, audio calling, text messaging, Web browsing or other hypertext transport protocol (HTTP)-based file transport, calendar synchronization, email, file transfer, and file synchronization.

17. The method of claim 10, further comprising performing IP address translation to enable the handover.

18. The method of claim 11, wherein the authentication credentials may include international mobile equipment identity (IMEI) credentials.

* * * * *